United States Patent
Smith et al.

(10) Patent No.: US 9,266,489 B2
(45) Date of Patent: Feb. 23, 2016

(54) VEHICLE DOOR ENERGY ABSORPTION PAD

(71) Applicant: Toyota Motor Engineering & Manufacturing North America, Inc., Erlanger, KY (US)

(72) Inventors: Sarah E. Smith, Canton, MI (US); Jay Zocher, Ann Arbor, MI (US); Phouvadol P. Khouphongsy, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/064,907

(22) Filed: Oct. 28, 2013

(65) Prior Publication Data

US 2015/0115585 A1    Apr. 30, 2015

(51) Int. Cl.
| | |
|---|---|
| *B60R 21/04* | (2006.01) |
| *B60R 13/02* | (2006.01) |
| *B60J 5/04* | (2006.01) |
| *B60R 21/00* | (2006.01) |

(52) U.S. Cl.
CPC .......... *B60R 21/0428* (2013.01); *B60J 5/0451* (2013.01); *B60R 13/0243* (2013.01); *B60R 2021/0006* (2013.01); *B60R 2021/0414* (2013.01)

(58) Field of Classification Search
CPC ............ B60R 2021/0414; B60R 21/04; B60R 21/0428; B60R 21/055
USPC .......... 280/751, 748; 180/274, 271; 296/146.6
See application file for complete search history.

(56) References Cited

U.S. PATENT DOCUMENTS

| | | | |
|---|---|---|---|
| 5,395,135 A | | 3/1995 | Lim et al. |
| 5,433,478 A | * | 7/1995 | Naruse ......................... 280/751 |
| 5,573,272 A | * | 11/1996 | Teshima ........................ 280/751 |
| 5,795,013 A | * | 8/1998 | Keller et al. ............. 296/187.05 |
| 6,474,721 B2 | | 11/2002 | Nishikawa et al. |
| 6,688,671 B2 | * | 2/2004 | Fukutomi ................... 296/146.6 |
| 7,124,541 B2 | * | 10/2006 | Fellner ............................ 49/502 |
| 7,291,378 B2 | | 11/2007 | Cowelchuk et al. |
| 7,357,444 B2 | * | 4/2008 | Cowelchuk et al. ..... 296/187.05 |
| 7,934,587 B2 | * | 5/2011 | Thenier et al. ................. 188/371 |
| 8,029,041 B2 | | 10/2011 | Hall et al. |
| 8,096,604 B2 | * | 1/2012 | Asenkerschbaumer et al. ........................ 296/146.6 |
| 8,152,218 B2 | | 4/2012 | Hall et al. |
| 8,157,309 B2 | * | 4/2012 | Ishikawa ...................... 296/1.08 |
| 8,827,350 B1 | * | 9/2014 | Deng et al. ................. 296/146.6 |
| 2007/0046073 A1 | * | 3/2007 | Ludwig et al. ................ 296/214 |
| 2009/0284041 A1 | * | 11/2009 | Hall et al. ................... 296/146.6 |
| 2009/0289470 A1 | * | 11/2009 | Dix et al. ................... 296/146.6 |
| 2010/0301630 A1 | * | 12/2010 | Ohta et al. ................. 296/146.6 |

* cited by examiner

*Primary Examiner* — Ruth Ilan
*Assistant Examiner* — Darlene P Condra
(74) *Attorney, Agent, or Firm* — Christopher G. Darrow; Darrow Mustafa PC (57) ABSTRACT

An energy absorption (EA) pad mountable on a vehicle door interior trim panel provides controlled collapse under side impact collision forces to minimize contact between the door and a vehicle passenger. The EA pad is in the form of a hollow body having an endwall, a sidewall, and an open end. A flange extends laterally from the open end. One or more slots and one or more ribs can be formed in the sidewall or the endwall of varying height, numbers, spacing, thickness, and shapes to provide the controlled collapse of the EA pad. A restraining rib structure is formed on the door trim panel adjacent to a least one side of the EA pad. In another aspect, a door trim panel includes the EA pad.

5 Claims, 10 Drawing Sheets

VEHICLE DOOR ENERGY ABSORPTION PAD

BACKGROUND

The present disclosure relates, in general, to vehicle doors and, particularly, to vehicle doors with energy absorption characteristics to absorb affect energy during a side impact collision.

Automotive vehicles are currently designed with energy absorbing structure to absorb impact energy during a vehicle collision to prevent significant intrusion of the vehicle sheet metal into the interior of the passenger cabin.

Figure 1:
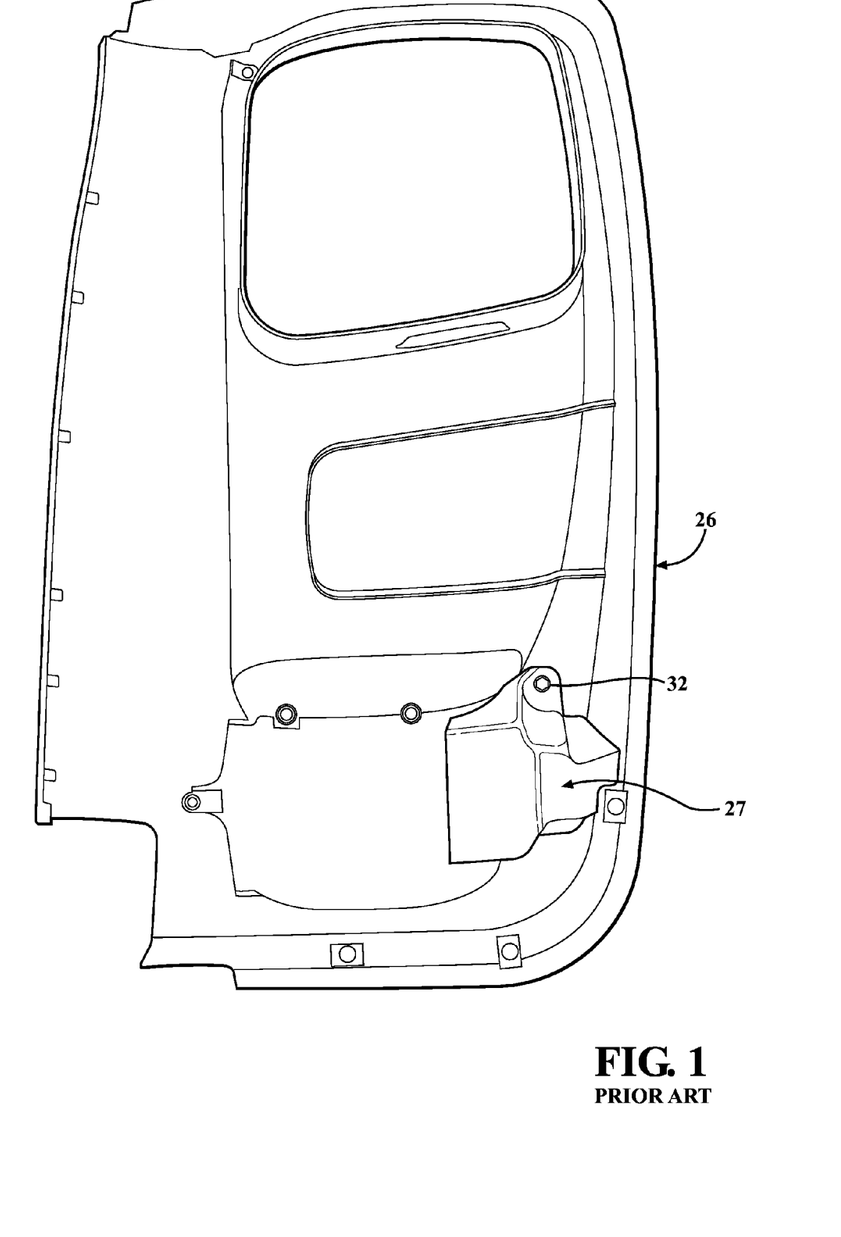
FIG. 1 is a front elevational view of a vehicle door trim panel showing a prior art foam energy absorption pad.

One such energy absorption device is a polyurethane foam energy absorption pad, shown in FIG. 1, which is mounted on the interior door trim panel at a position in line with a passenger's hip in a vehicle seat. The pad absorbs impact energy during a side impact collision so as to minimize forced contact between the passenger's hip and the vehicle door.

SUMMARY

An energy absorption pad is mountable on a vehicle door inner trim panel. The energy absorption (EA) pad includes a body having an endwall with peripheral edges. A sidewall extends from the peripheral edges of the endwall to an opposite end and defines a hollow interior in the body. The opposite end of the sidewall defines an open end in the body opposite the endwall. At least one or more of a flange extending laterally from the opposite end of the sidewall, at least one slot having a least a portion disposed in the sidewall, and at least one rib on the endwall is provided on the body to control collapse of a body under an impact force acting on the body.

The flange is formed on the opposite end of the sidewall and extends laterally outward from the sidewall.

At least one slot can be formed in one or more of discrete sections of the sidewall of the body. A plurality of slots may be formed in each of the discrete sidewall sections. The number of the plurality of slots in the body in each sidewall section may vary or be the same, or may have equal lengths or vary in each side section or in different sidewall sections. The spacing between slots in each sidewall section or from sidewall section to sidewall section may be the same or vary. The width between opposed sides of each slot as well as the width from one end to another end of any slot may be equal or may vary.

The at least one rib provided on the endwall can include a plurality of ribs. The plurality of ribs may vary in length, thickness, the spacing between adjacent ribs, height of ribs, or the height from end to end any one rib.

In another aspect, a restraining rib structure is formed on the door trim panel adjacent to one or more sides of the EA pad to restrain buckling or bowing out of the sidewall of the EA pad.

BRIEF DESCRIPTION OF THE DRAWING

The various features, advantages and other uses of the present vehicle door energy absorption pad will become more apparent by referring to the following detailed description and drawing in which.

DETAILED DESCRIPTION

A vehicle door, such as an automotive vehicle door, includes an outer door panel joined to an inner door panel both typically formed of metal. Fasteners on the interior side of the door inner panel mount a non-metallic interior door trim panel 26, hereafter referred to as "the door trim panel 26", FIG. 1.

The door trim panel 26 has an irregular surface contour to form armrest, handles, as well as pockets or recesses to mount door operating hardware, such as door locks associated window regulator switches, door lock switches as well as aesthetic shape.

A prior art energy absorption pad 27, formed of a foam material, is attached to the door trim panel 26 at the hip point aligned with the location of a passenger's hip when seated on the vehicle seat immediately adjacent to the door trim panel 27. The energy absorption pad 27 is intended to function as energy absorption mass to minimize impact forces created by a side impact collision on the vehicle door 20 from being transferred to the passenger's hip.

Referring now to FIGS. 2-5, the prior art energy absorption (EA) pad 26, shown in FIG. 1, is replaced with one aspect of an energy absorption pad 30. The energy absorption pad 30, hereafter also referred to as an EA pad 30, is a one-piece, injection molded body 31 which is mounted to the door trim panel 26 by suitable fasteners, such as plastic heat stakes (not shown), which are mountable through apertures 32 in one or more mounting surfaces 34 and 36 shown only by example, in the body 31.

By way of example only, the EA pad 30 may be formed of an impact modified filled polypropylene material. Other suitable materials may also be employed to injection mold or otherwise form the one-piece body 31.

The body 31, in this aspect of the EA pad 30, includes an endwall 40 of generally planar or flat construction although it will be understood that the endwall 40 may alternately have an irregular, non-linear shape. The endwall 40 has a generally polygonal, four-sided shape, by example only. The endwall 40 includes peripheral edges, all denoted by reference number 41 along each side.

Figure 2:
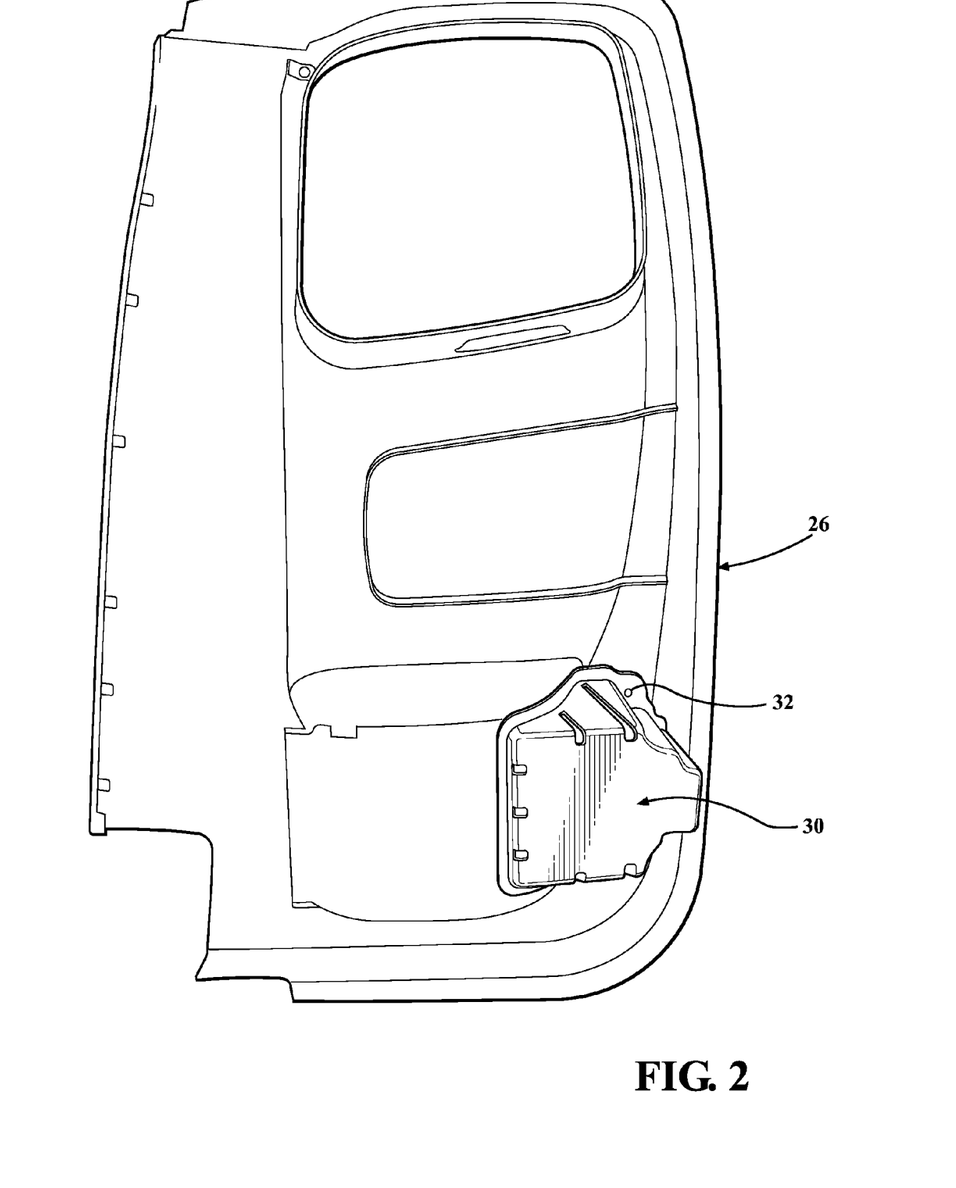
FIG. 2 is a front elevational view of a vehicle door interior trim panel showing one aspect of an improved energy absorption pad.
Figure 3:
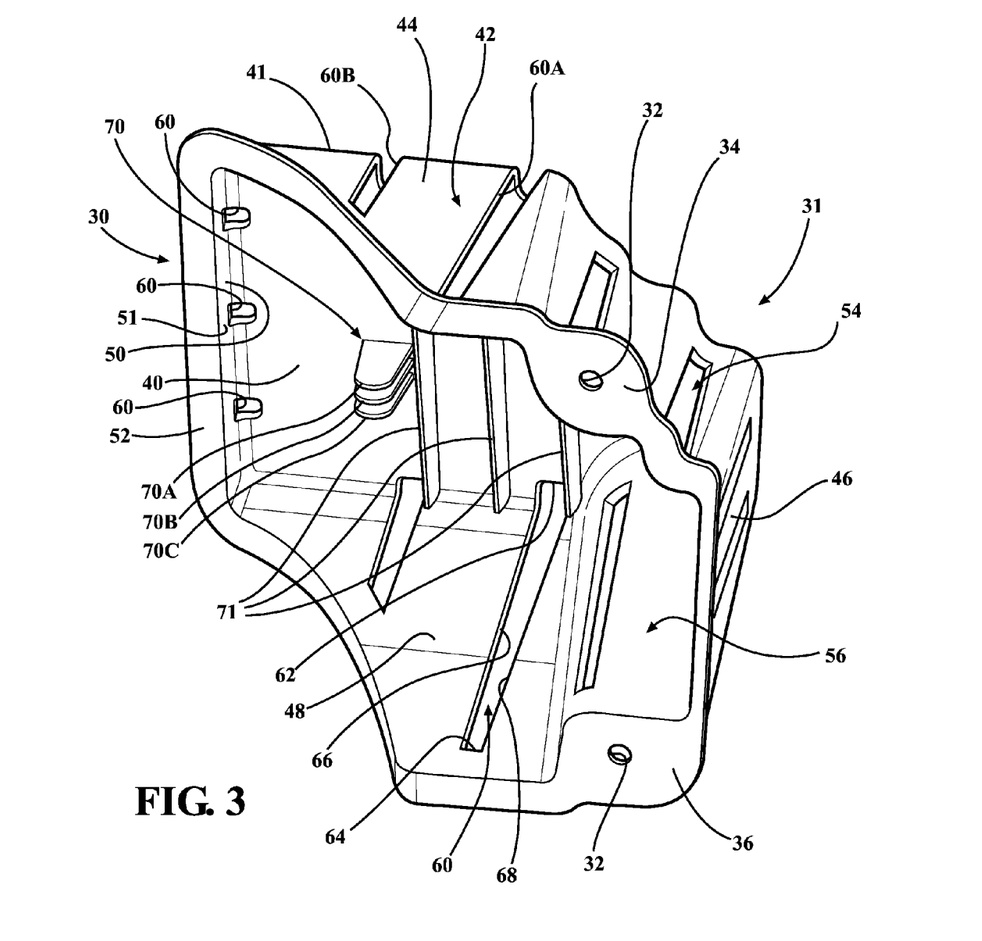
FIG. 3 is a perspective view of the one aspect of the energy absorption pad shown in FIG. 2.

A sidewall denoted generally by reference number 42 projects angularly from peripheral edges 41 of the endwall 40. The sidewall 42 may be a continuous curved or circular sidewall. Alternately, and as shown in FIG. 3, the sidewall 42 is formed of a plurality of interconnected, angularly disposed sidewalls 44, 46, 48 and 50. Each of the sidewalls 44, 46, 48 and 50 terminate in an edge opposite from the peripheral edge 41 of the endwall 40. The edge 51 may be continuous or discontinuous about the periphery of the body 31. As shown in FIG. 2, the endwall 40, the sidewalls 44, 46, 48, and 50, cooperate to define a hollow interior within the body 31. The edge 51 surrounds and defines an open end in the body 31 opposed from the endwall 40.

A flange 52 may be disposed on the outer peripheral edge 51 of the sidewalls 44, 46, 48 and 50 and projects angularly outward from the sidewalls 44, 46, 48 and 50. The flange 52 may be continuous about the periphery of the sidewalls 44, 46, 48 and 50, as shown in FIG. 2, or the flange 52 may be formed of discontinuous sections.

The flange 52 may have an overall linear shape disposed in a common plane or mixed linear and curved sections disposed in different planes. The different dispositions of sections of the flange 52 correspond to different lengths, heights and shape of the sidewalls 44, 46, 48 and 50.

It will be noted, as shown in FIG. 2, that certain of the sidewalls, such sidewalls, 44, 46, and 48, have a linear wall portion and cutouts or recesses extending into the interior of the body 31 from the linear wall portions. The recesses form interior located bosses 54 and 56, an upper edge of which forms one of the mounting surfaces 34 and 36, respectively, for receiving the fasteners through the apertures 32 to attach the body 31 to the door trim panel 26.

The aspect of the EA pad 30, shown in FIG. 2, is constructed with one or more of the flange 52, the slots, and the ribs which facilitate a controlled collapse of the EA pad 30 to absorb energy during a side impact collision on the vehicle door 20 to minimize the transfer of energy through the vehicle door to the passenger's hip to minimize or prevent injury to the passenger.

At least one slot, denoted generally by reference number 60, is provided in any one or more or all of the sidewalls 44, 46, 48, and 50, in equal, identical or varying numbers, sizes, and shapes, as described below.

Although the slot 60 could have oval circular or irregular shape, by example only, the slot or slots 60 are shown in FIGS. 2-5 as having a polygonal shape, particularly, a rectangular shape formed of a first ends 62 and second end 64 and opposed sides 66 and 68. Although a single slot 60 is formed in each of the sidewalls 44 and 48, a plurality of slots 60, such as two or more slots 60, are formed in the sidewalls 46 and 50.

Figure 4:
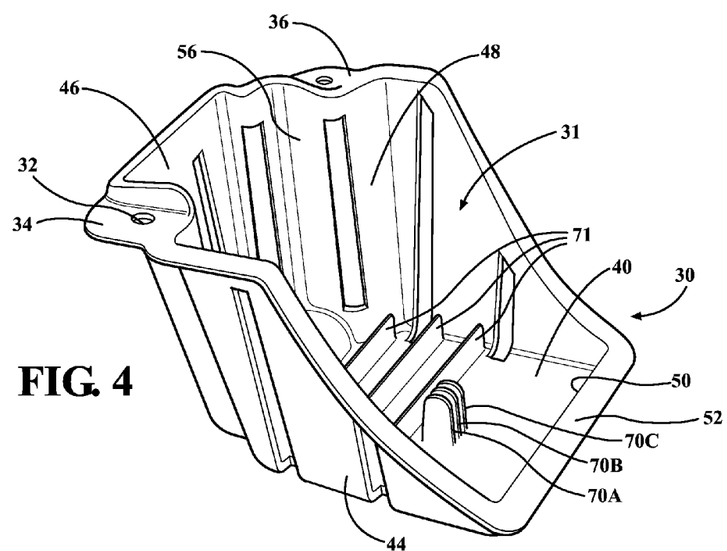
FIG. 4 is a left side perspective view of the energy absorption pad shown in FIG. 3.
Figure 5:
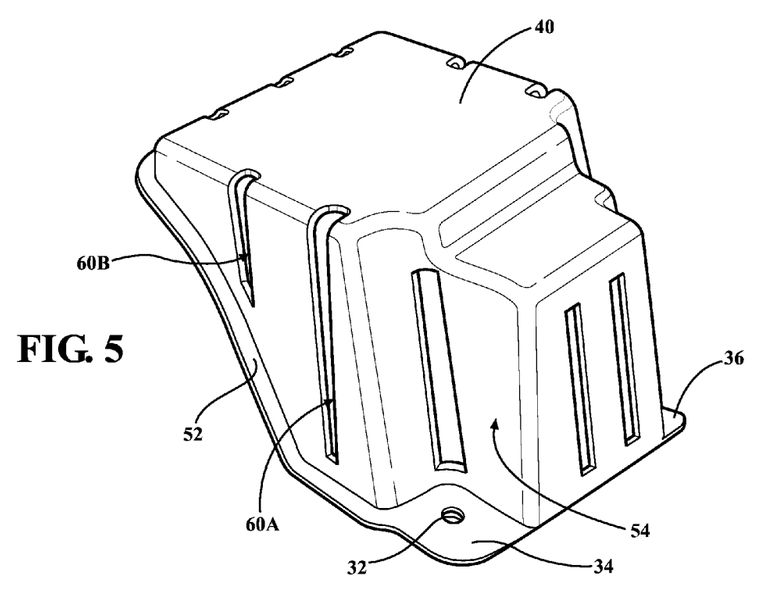
FIG. 5 is a perspective view showing the outside of the energy absorption pad depicted in FIG. 4.

The slots 60 shown in FIGS. 3-5, have a regular rectangular shape, by example with perpendicular corners between the parallel ends 62, 64, and the spaced sides 66 and 68. It will be understood that the slot 60 can have non-perpendicular ends 62 and 64 or sides 66 and 68 so that any one of the slots 60 can vary in width from a small width at one end 62 or 64 to a larger width at the opposite end 64 or 67. Likewise, as shown in FIG. 3, any one or more slots 60 can vary in length between a longer length slot 60A and a shorter length slot 60B. The different length slots 60A and 60B may be arranged in one or more of the sidewalls 44, 46, 48, and 50 or in all of the sidewalls 44, 46, 48, and 50.

As also shown in FIG. 4, the slots 60 may be provided in equal spacings within each of the sidewalls 44, 46, 48 and 50, or at equal spacings around the entire circumference of the sidewalls 44, 46, 48 and 50, or the slots 60 may be at unequal spacings in any or more or all of the sidewalls 44, 46, 48, and 50.

The location of the ends 62 and 64 of each or any of the slots 60 may also vary. As shown in FIGS. 3-5, the ends 62 of the slot 60, in each of sidewalls 44, 46, 48 and 50 extend over the edge 41 of the endwall 40 into an adjacent portion of the endwall 40. The opposite end 64 of the slot 60 is disposed entirely in the sidewall 46. Alternately, the entire length of any one slot 60, including both ends 62 and 64, may be disposed completely in one sidewall.

It is understood that any of the above-described variations in the shape or location of any portion of any slot 60 can be employed in any or all of the sidewalls 44, 46, 48 and 50 of the body 31 of the EA pad 30 to provide a controlled collapse of the EA pad 30.

One or more ribs 70 may be provided in the body 31 of the EA pad 30 to support the shape of the body 31 as well as to aid in the controlled collapse of the EA pad 30 by changing the rigidity of the endwall 40.

The ribs 70 are formed on the endwall 40; although it is conceivable within the scope of the present EA pad 30 to provide ribs on the sidewall 42 of the body 31.

The ribs 70, such as ribs 70A, 70B, and 70C in FIG. 3, have, for example only, a thin or narrow thickness and project angularly, such as perpendicularly, for example, from the inner surface of the endwall 40 within the hollow interior of the body 31.

As shown in FIGS. 2 and 4B, the ribs 70A, 70B, and 70C extend generally in parallel along one axis of the body 32. Some or all of the ribs 70 could also extend along a perpendicular axis or along any axis within the body 31.

In order to aid in providing a controlled collapse to absorb energy during a side impact on the vehicle door 20, the ribs 70 may have varying lengths, as described hereafter. It is also possible to vary the height or extent of each of the ribs 70 from the endwall 40.

While the ribs 70 may have a constant height along their entire extent, it is also possible to vary the height of any rib 70 from end to end.

The ribs 70A, 70B, and 70C are illustrated, by example only, in FIG. 3 as having a linear shape from end-to-end. It is also possible within the scope of the EA pad 30 to form the ribs 70A, 70B, and 70C with different thicknesses, different heights, and irregular shapes, such as providing radiuses in all or some of the ribs, or simply forming the ribs in any geometric or irregular shape.

As shown in FIGS. 3 and 4, in addition to the ribs 70A, 70B, and 70C, an additional set of one or more ribs 71 may also be formed on the endwall 40. The ribs 71 extend along a different axis than the ribs 70A, 70B, and 70C and are generally disposed perpendicular to the ribs 70A, 70B, and 70C, by example. The ribs 71 also have a shorter height and a longer length than the ribs 70A, 70B, and 70C, again by example only.

The slots 60 and the ribs 70 is provided at varying locations within the body 31 in varying heights, geometric shapes, lengths, orientations, positions, etc.

A second aspect of an EA pad 80 is shown in FIGS. 6-8B. The EA pad 80 is similar to the EA pad 30 in that the EA pad 80 has a body 81 includes an endwall 82 and a plurality of sidewalls 84, 86, 88, and 90. The sidewalls 84, 86, 88, and 90 extend from peripheral edges 83 of the endwall 82 and terminate in an edge 85 from which a flange 92 extends laterally outward. One or more mounting surfaces 94 are formed as part of or adjacent to the flange 92 to receive fasteners through mounting apertures 95 to attach the EA pad 80 to the door trim panel 26.

The EA pad 80, like the EA pad 30, includes slots 96 in some or all of the sidewalls 84, 86, 88, and 90. The slots 96 can vary, in the same manner as the slots 60 described above, in number, length, width, location, i.e., solely contained in the sidewalls 84, 86, 88, and 90 or in the endwall 40 and one sidewall 84, 86, 88, or 90.

Figure 8A:
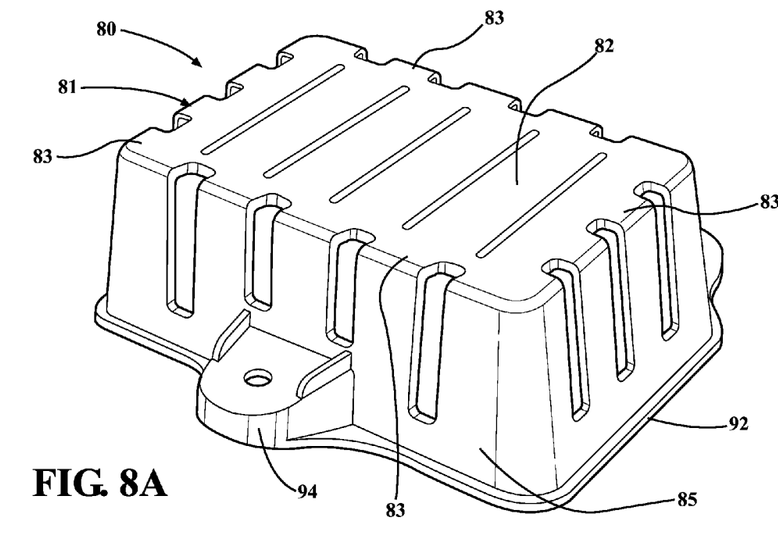
FIG. 8A is a bottom perspective view of energy absorption pad shown in FIG. 7A.
Figure 8B:
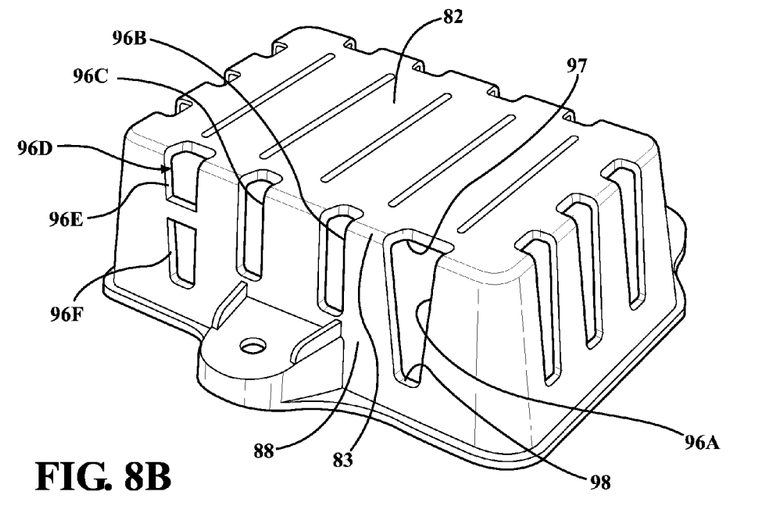
FIG. 8B is a perspective view, similar to FIG. 8A, but showing alternate configurations of the slots in the energy absorption pad.

The slots 96 can also vary in shape, location, spacing, and numbers on any of the sidewalls 84, 86, 88, and 90 of the body 81. As shown in FIG. 8B, slot 96A may vary in overall width from a larger width end 97 located past the edge 83 of the endwall 82 and lying in the endwall 82 to a smaller opposite end 98 contained in the sidewall 88. The spacing between the slots 96A, 96B, and 96C may be equal or constant, while the spacing between any of the slots, such as slots 96C and 96B, may be smaller or larger than the spacing between the other slots 96A, 96B, and 96C.

Any or all of the slots, such as slot 96D may be split into two discontinuous, generally co-linear slots 96E and 96F.

Figure 7A:
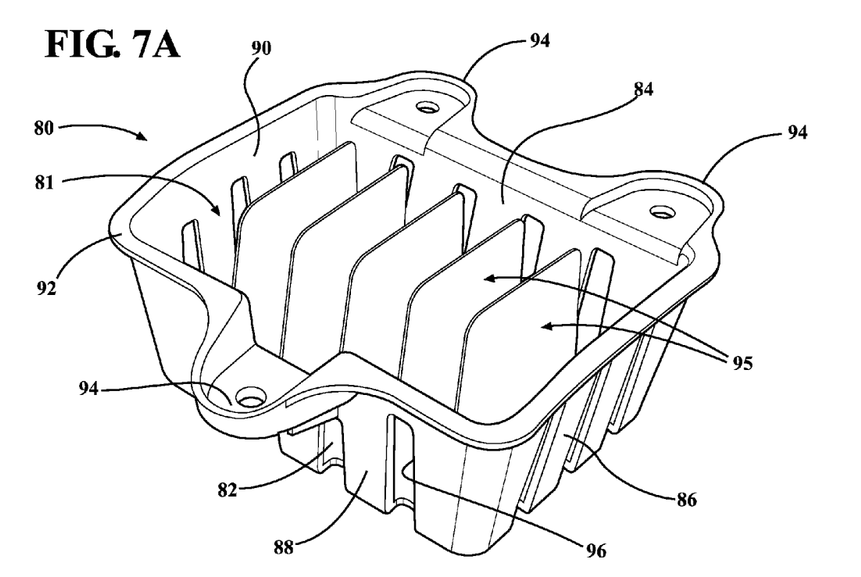
FIG. 7A is a perspective view of the energy absorption pad shown in FIG. 6.

A plurality of ribs 95 are also formed in the endwall 82 and extend angularly, such as perpendicularly, for example, from the endwall 82. The ribs 95 have a relatively thin thickness and equal spacing. Although the ribs 95 may have a constant thickness along their entire length, by example only, as shown in FIG. 7A, some or all of the ribs 95 may be split into two discontinuous, co-linear ribs 95A and 95B having an identical configuration, but separated by a small gap between inner edges. Other design configurations for the ribs are shown in FIG. 7C. For example, a rib 95C has a single elongated continuous body configuration with a small notch 97 extending only partially through the height of the rib 95C.

Further, while each of the ribs 95 may have the same constant height from end to end, it is possible to vary the height of the rib, such as rib 95D, from one end to the other, so that one end of the rib 95D is higher or lower than the opposite end of the rib 95B.

The spacing between the ribs 95C, 95E and 95F may be constant, while the spacing between ribs 95B, 95G and 95H may vary, for example, where the spacing between ribs 95D and 96G is greater than the spacing between ribs 95G and 95H.

Figure 7B:
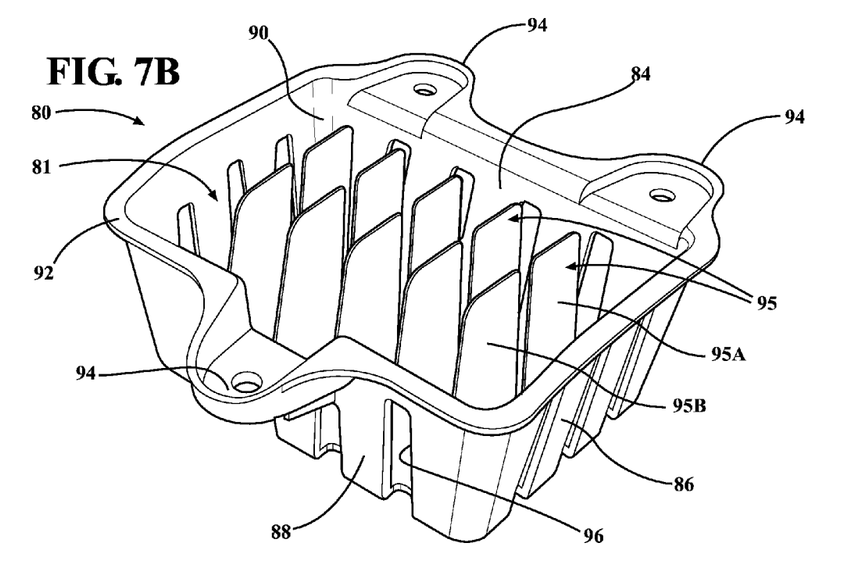
FIG. 7B is a perspective view of the energy absorption pad shown in FIG. 7A, but depicting other configuration modifications.
Figure 7C:
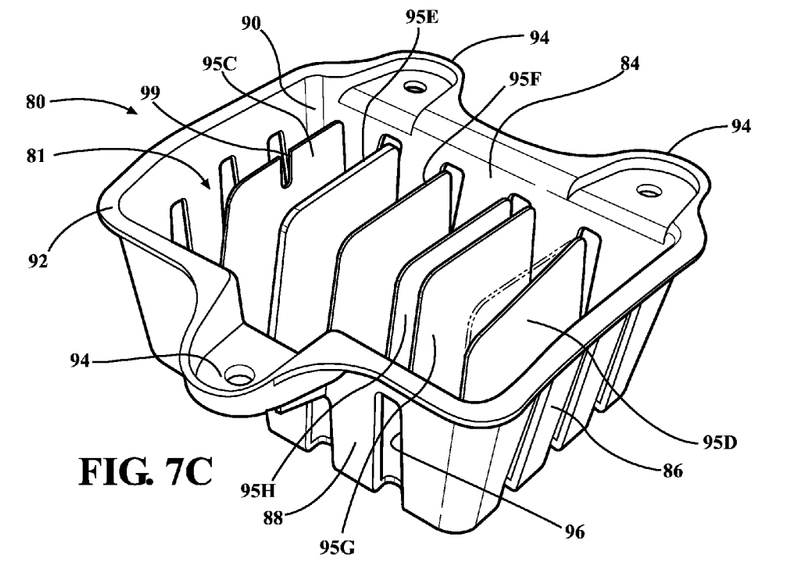
FIG. 7C is a perspective view of the energy absorption pad shown in FIG. 7A, but depicting other configuration modifications.

As shown in FIG. 7B, a flange 92, while continuous about the entire periphery of one end of the sidewalls 84, 86, 88, and 90, has a linear shape. The flange 92 may also include linear portions interspersed with curved or arcuate portions to follow the contour of the adjacent door trim panel 26.

Figure 9:
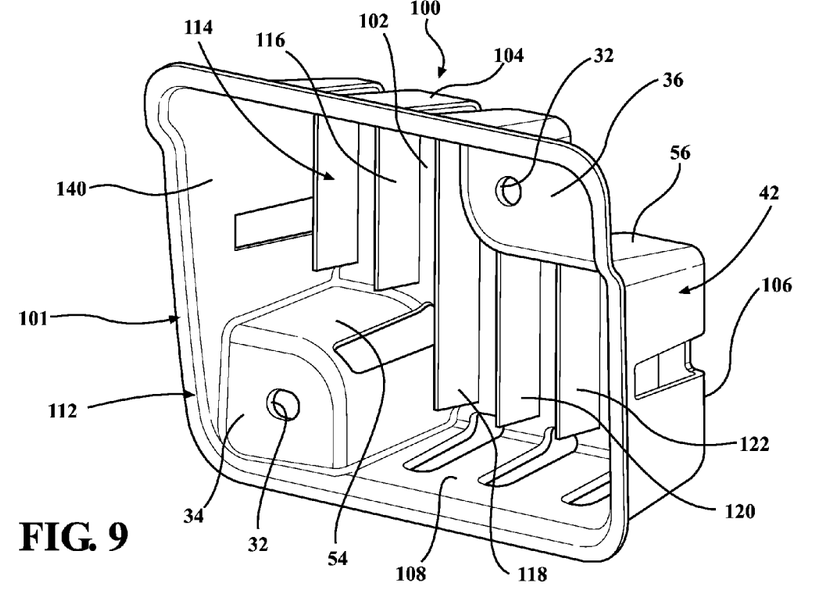
FIG. 9 is a perspective view of a modified energy absorption pad, similar to the energy absorption pad shown in FIG. 8A.

Referring now to FIG. 9, a modification to the EA pad 80 is shown in an EA pad 100. The EA pad 100 is similar to the EA pad 80 in that it includes an endwall 102 and sidewalls 104, 106, 108 and 110. A flange 112 projects from an outer end of the sidewalls 104, 106, 108, and 110.

The EA pad 100 includes ribs 114 and 116, which have a first equal height from the endwall 102. Adjacent ribs 118, 120 and 122 have a greater height above the endwall 102. The ribs 114 and 116 also have a shorter length than the longer length adjacent ribs 118, 120, and 122.

Figure 10:
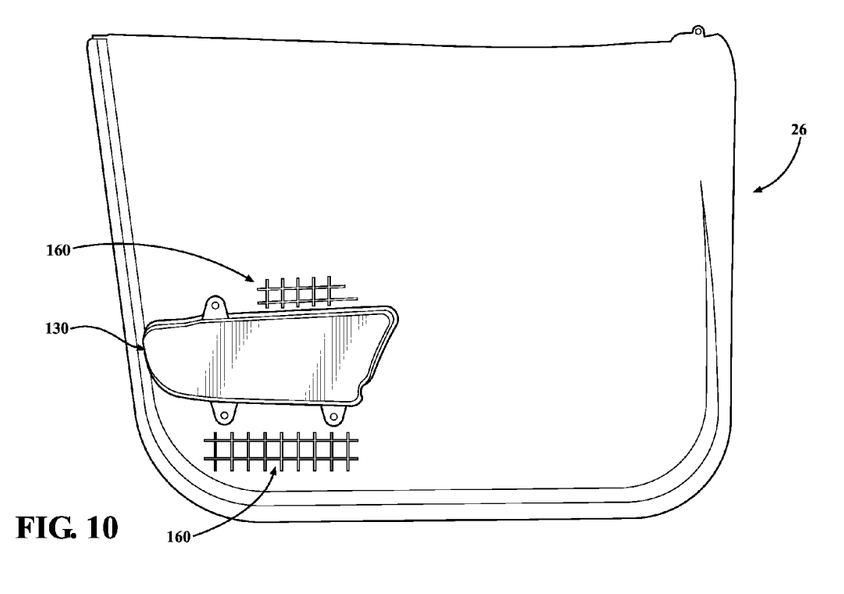
FIG. 10 front elevational view of an another aspect of an energy absorption pad mounted on a different shaped door trim panel.
Figures 11A, 11B:
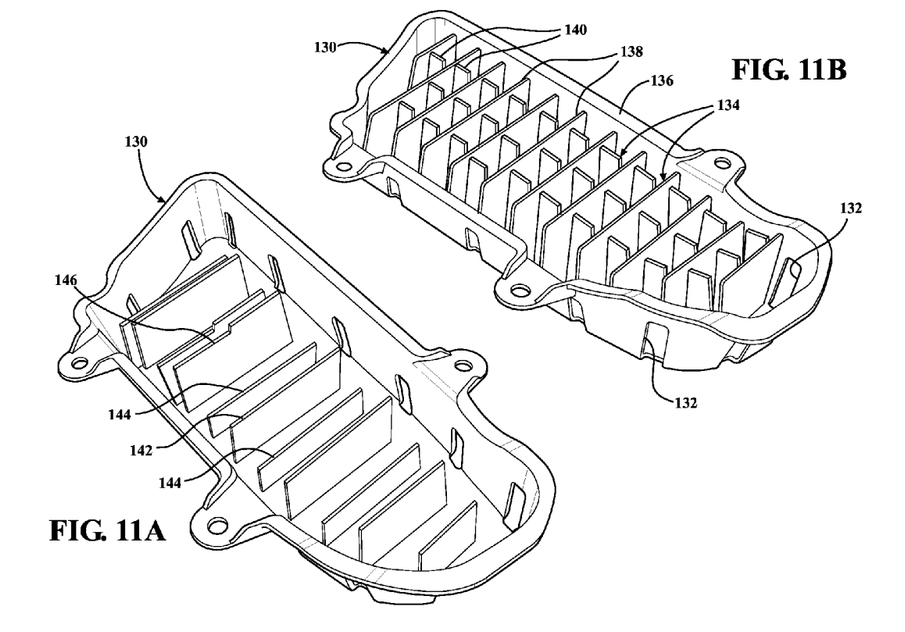
FIG. 11A is a perspective view of one aspect of the energy absorption pad shown in FIG. 10.
FIG. 11B is a perspective view of another aspect of the EA pad shown in FIG. 10.

Another aspect of an EA pad 130 is illustrated in FIGS. 10 and 11A. The EA pad 130 has an elongated rectangular shape as compared to the more square configurations of the EA pads 30 and 80. The EA pad 130 is of similar construction as the EA pads 30 and 80 and includes slots 132, ribs 134, and an outer peripheral flange 136.

In this aspect, the ribs 134 are provided in a grid shape formed of a first series of ribs 138, disposed in parallel to each other and running in the direction of one axis of the EA pad 130 and a second set of ribs 140 which are also parallel to each other, but are angularly disposed, generally perpendicularly, to the ribs 138.

The ribs 140 are individual ribs aligned in generally parallel rows between the longer ribs 138. The ribs 140 may have equal heights above the endwall of the EA pad 130 or unequal heights, i.e., varying in height from row to row or within each row of ribs 140.

FIG. 11B depicts a modification to the EA pad 130 in which the internal rib structure is modified from that shown in FIG. 11A. In the EA pad 130' shown in FIG. 11B, the ribs 140 are removed and the longer ribs 138 modified in alternating heights, such as a higher height rib 142 located between two shorter height ribs 144.

Any of the EA pads 30, 80, and 130 may be provided with a configurable structure having a predetermined amount of stiffness and rigidity yet is bendable under load to absorb energy resulting from a side impact collision. Certain ribs 146 may have a notched upper end.

The flange, such as flange 92 of the EA pad 80, is provided to increase the rigidity of the EA pad 60 by minimizing outward bowing of the sidewalls of the EA pad 30, 80, or 130. The slots, such as slots 60, may be provided in any portion of the sidewall or discrete sidewall section. Thus, one or more slots may be provided in any one of the sidewall sections or in all of the sidewall sections. The slots may vary in end to end length, width compared to other slots, width from end to end, that is, one end is larger than the opposite end of one slot, location, that is, one slot is contained entirely within the sidewall or, alternately, the slot has one end terminating in the endwall and the other end terminating in the sidewall. The slots may be provided in varying numbers in each discrete sidewall section.

Likewise, the ribs may be provided in varying numbers, varying heights and lengths, split completely into two discrete collinear rib ribs, partially split, or disposed in one or more angular axes on the endwall.

It will be understood that the flange, slots and ribs may be interchangeably varied in any of the above characteristics and provided in one or more configurations on any of the EA pads 30, 80, and 130.

Figure 6:
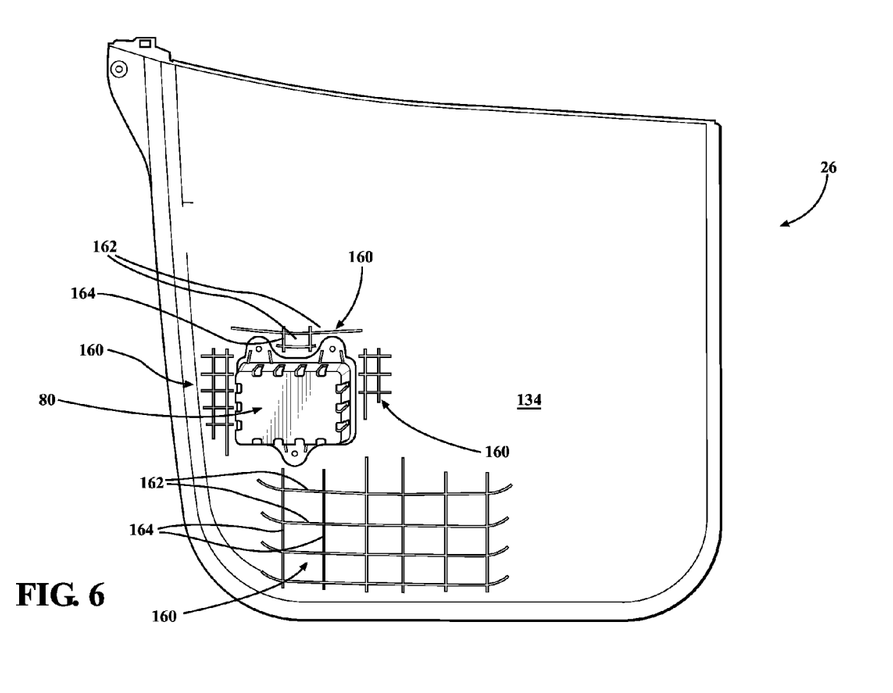
FIG. 6 is a front elevational view of another aspect of an energy absorption pad mounted on a different shaped door trim panel.

Referring now to FIGS. 2, 6, 10, there is depicted an aspect of a vehicle door which includes a restraining rib structure 160 formed in the door trim panel 26 at various locations surrounding the mounting location of the EA pads 30, 80, or 130. The restraining rib structure 160 may include one or more parallel-arranged ribs 162 which extend in one direction along one side of one of the EA pads 30, 80 or 130. Alternately, although the rib structure 160 may take any configuration, by example only, the rib structure 160 includes a first set of parallel disposed ribs 162 extending outward from a surface 134 of the door trim panel 26 and a second set of ribs, including at least one rib 166, also extending outward from the surface 134 of the door trim panel 26, but intersecting and disposed angularly, or generally perpendicular, to the ribs 162.

The restraining rib structure 160 may be formed along one, two, three, or all sides of the EA pads 80 or 130. The restraining rib structure functions to stiffen the door trim panel 26 adjacent to the one or more sides of the EA pads 30, 80, or 130 and aids in restraining the sidewalls of the EA pads 80 or 130 from buckling and bowing open under side impact forces.

What is claimed is:

1. An energy absorption pad mountable on a vehicle door comprising:
    a body having an endwall with a peripheral edge;
    a plurality of interconnected sidewalls, at least one sidewall of the plurality of sidewalls extending from the peripheral edge of the endwall to an opposite edge and defining a hollow interior in the body, the opposite edge defining an open end in the body opposite the endwall;
    at least one flange extending laterally from the opposite edge of the at least one sidewall;
    at least three, unequally spaced-apart slots defined having at least a portion disposed in the at least one sidewall; and
    at least one rib on the endwall of the body to control collapse of the body by an impact force acting on the body.

2. The energy absorption pad of claim 1 wherein the at least one rib further comprises:
    a plurality of individual, non-connected ribs extending from the endwall into the interior of the body; and
    the ribs having equal height above the endwall.

3. The energy absorption pad of claim 1 wherein the at least one rib has a variable height from end to end.

4. The energy absorption pad of claim 1 wherein the at least one rib comprises:
    a plurality of individual, non-connected ribs; and
    the ribs extending in parallel along one axis on the endwall of the body.

5. The energy absorption pad of claim 1 wherein the at least one rib comprises:
    a plurality of individual, non-connected ribs; and
    the ribs extending in two angularly disposed axes relative to the endwall of the body.

* * * * *